(12) United States Patent
Ikuta (10) Patent No.: US 9,295,241 B2
(45) Date of Patent: Mar. 29, 2016

(54) FISHING REEL

(71) Applicant: Shimano Inc., Sakai, Osaka (JP)

(72) Inventor: Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 79 days.

(21) Appl. No.: 14/242,050

(22) Filed: Apr. 1, 2014

(65) Prior Publication Data

US 2014/0319264 A1    Oct. 30, 2014

(30) Foreign Application Priority Data

Apr. 30, 2013    (JP) .................................. 2013-094965

(51) Int. Cl.
    *A01K 89/01*    (2006.01)
    *A01K 89/00*    (2006.01)

(52) U.S. Cl.
    CPC ..................................... *A01K 89/006* (2013.01)

(58) Field of Classification Search
    CPC . A01K 89/004; A01K 89/006; A01K 89/015; A01K 89/016
    See application file for complete search history.

(56) References Cited

U.S. PATENT DOCUMENTS

| | | | | |
|---|---|---|---|---|
| 5,110,066 | A * | 5/1992 | Toda ............................. | 242/255 |
| 5,906,323 | A * | 5/1999 | Morimoto et al. ............ | 242/283 |
| 6,029,922 | A * | 2/2000 | Kim et al. ...................... | 242/283 |
| 2002/0185562 | A1* | 12/2002 | Landwerlen ................... | 242/283 |
| 2003/0205637 | A1* | 11/2003 | Nakajima et al. ............. | 242/283 |
| 2006/0175448 | A1* | 8/2006 | Sugawara et al. ............. | 242/224 |
| 2010/0301150 | A1* | 12/2010 | Law et al. ...................... | 242/283 |

FOREIGN PATENT DOCUMENTS

| | | |
|---|---|---|
| JP | 3-10860 Y2 | 3/1991 |
| JP | 2004-222559 A | 8/2004 |

OTHER PUBLICATIONS

European Search Report of corresponding EP Application No. 14 16 3094.7 dated Sep. 24, 2014.

* cited by examiner

*Primary Examiner* — Emmanuel M Marcelo
(74) *Attorney, Agent, or Firm* — Global IP Counselors (57) ABSTRACT

A fishing reel includes a reel unit, a handle shaft, a handle arm, a handle knob, a nut and an anti-loosening member. The handle shaft includes an anti-loosening engaging portion. The handle arm includes an elongated hole. The handle shaft is inserted in the elongated to be non-rotatably engaged with the handle arm. A position of the shaft in the elongated hole is adjustable. The anti-loosening member is configured on the nut member and is selectively set in a first position and a second position. The anti-loosening member is engaged with the anti-loosening engaging portion in the first position to prevent the nut member from loosening, and is disengaged from the anti-loosening engaging portion in the second position to allow the nut member to rotate in the loosening direction.

16 Claims, 7 Drawing Sheets

FISHING REEL

CROSS-REFERENCE TO RELATED APPLICATIONS

This application claims priority to Japanese Patent Application No. 2013-94965 filed on Apr. 30, 2013, the entirety of which is hereby incorporated by reference in its entirety.

BACKGROUND OF THE INVENTION

1. Field of the Invention

The present invention generally relates to a fishing reel.

2. Background Art

A fishing reel is provided with a handle assembly for winding a fishing line. The handle assembly includes a handle arm and a handle knob. The handle arm is fixed to the tip portion of a handle shaft. The handle knob is mounted to the tip portion of the handle arm. Further, a type of handle assembly has been also provided so far. This type of handle assembly is capable of changing the length of the handle arm.

For example, a fishing reel, which is described in Japanese Laid-Open Patent Application Publication No. JP-A-2004-135624, is configured to be capable of changing the length of the handle arm by manually tightening or loosening a nut member. On the other hand, a handle device for a fishing reel such as described in Japanese Examined Utility Model Application Publication No. JP-Y-H03-10860 and that described in Japanese Laid-Open Patent Application Publication No. JP-A-2004-222559 are configured to be capable of changing the length of the handle arm by tightening or loosening a nut and a bolt through a rotational operation of the handle.

As described in the aforementioned Publication Nos. JP-A-2004-135624, JP-Y-H03-10860 and JP-A-2004-222559, the position of the handle arm attached onto the handle shaft is configured to be changed by loosening the nut and the bolt that fix the handle arm onto the handle shaft. Accordingly, it is possible to change the length of the handle arm.

However, in the structure described in the Publication No. JP-A-2004-135624, the nut is easily loosened while in use of the fishing reel, and the handle arm cannot be stably fixed onto the handle shaft. On the other hand, in the structures described in the Publication Nos. JP-Y-H03-10860 and JP-A-2004-222559, the nut and the bolt are tightened by a fishing-line winding operation of the handle. Therefore, when a handle load is increased, an excessive load acts on the bolt and thereby the bolt can be damaged or broken. Further, in the structure of the Publication No. JP-A-2004-222559, chances are that the handle is rotated reversely from the fishing-line winding direction by quick lifting of a fishing rod, and thereby, the bolt is loosened.

It is an advantage of the present invention to change the length of a handle arm and prevent loosening of a screw member for fixing the handle arm onto a handle shaft in a fishing reel.

SUMMARY

A fishing reel includes a reel unit, a handle shaft, a handle arm, a handle knob, a nut, and an anti-loosening member. The handle shaft is rotatably supported by the reel unit. The handle shaft includes an anti-loosening engaging portion and a male threaded portion on a tip portion thereof. The handle arm extends from a first end portion thereof to a second end portion thereof in a direction intersecting with the handle shaft. The handle arm includes an elongated hole in the first end portion thereof. The elongated hole extends in the direction. The handle shaft is inserted in the elongated hole to be non-rotatably engaged with the handle arm. A position of the shaft in the elongated hole being adjustable. The handle knob is rotatably attached to the second end portion of the handle arm. The nut member includes a female threaded portion. The female thread portion is screwed onto the male threaded portion of the handle shaft. The anti-loosening member is configured on the nut member and is being selectively set in a first position and a second position. The anti-loosening member is engaged with the anti-loosening engaging portion in the first position to prevent the nut member from loosening. The anti-loosening member is disengaged from the anti-loosening engaging portion in the second position to allow the nut member to rotate in the loosening direction.

BRIEF DESCRIPTION OF THE DRAWINGS

Referring now to the attached drawings which form a part of this original disclosure.

DETAILED DESCRIPTION OF EMBODIMENTS

Entire Structure

Figure 1:
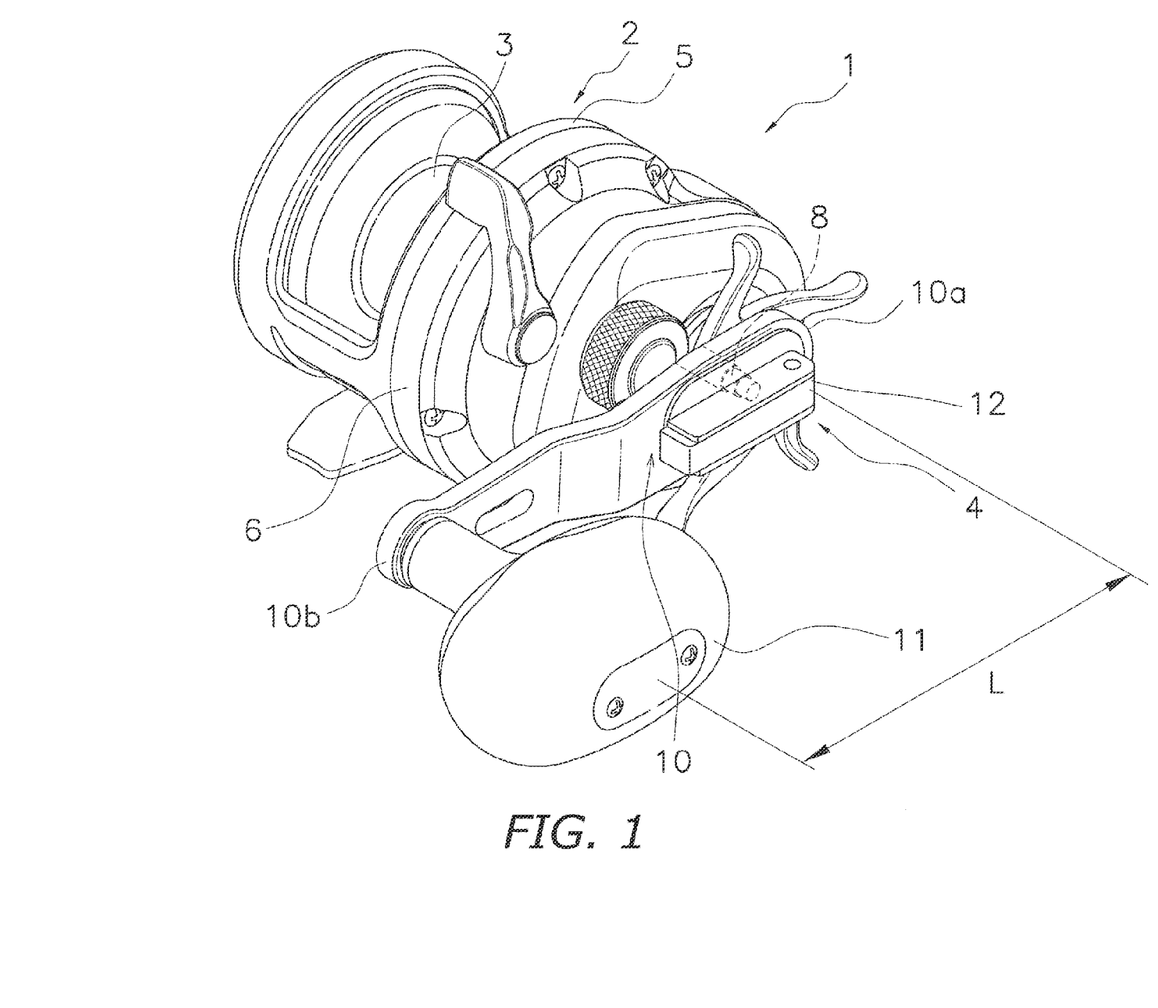
FIG. 1 is a perspective view of a dual-bearing reel according to an exemplary embodiment of the present invention.

FIG. 1 illustrates a dual-bearing reel 1 as a fishing reel according to an exemplary embodiment of the present invention. The dual-bearing reel 1 includes a reel unit 2, a spool 3 rotatably supported by the reel unit 2, and a handle assembly 4. The reel unit 2 includes a frame 5 and a cover member 6 for covering one side of the frame 5, i.e., the side to which the handle assembly 4 is attached.

The handle assembly 4 is fixed onto a handle shaft 8 rotatably supported by the reel unit 2. The handle assembly 4 includes a handle arm 10, a handle knob 11, and a nut member 12. Further, the nut member 12 is provided with an anti-loosening member (to be described hereinafter) for preventing the nut member 12 from being loosened.

Handle Shaft

Figure 2:
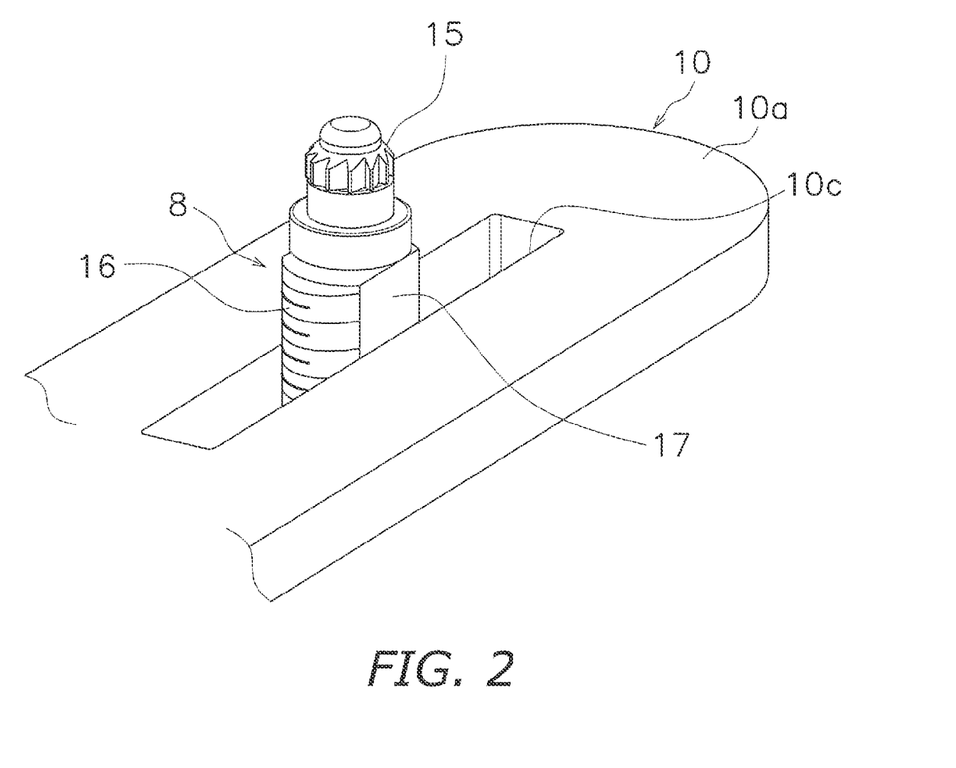
FIG. 2 is an exploded perspective view of a handle arm coupled part.

As illustrated in FIG. 2, the handle shaft 8 has a gear portion 15 serving as an anti-loosening engaging portion, a male threaded portion 16 and an engaging portion 17 for rotation prevention.

Figure 3:
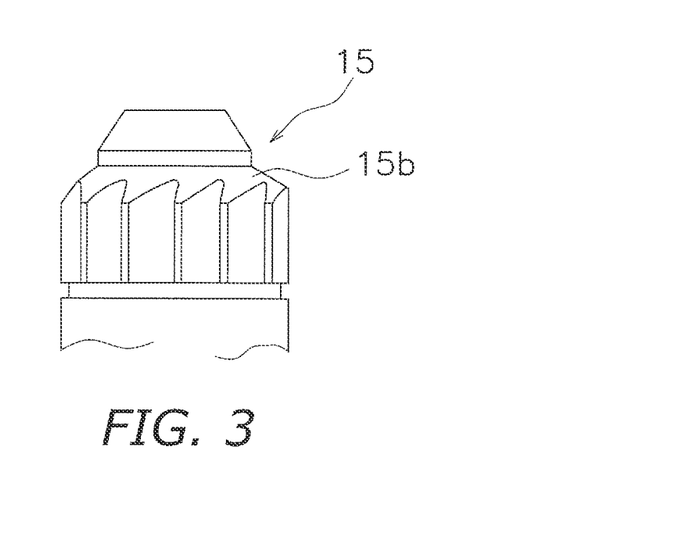
FIG. 3 is an external view of a tip portion of a handle shaft.
Figure 4:
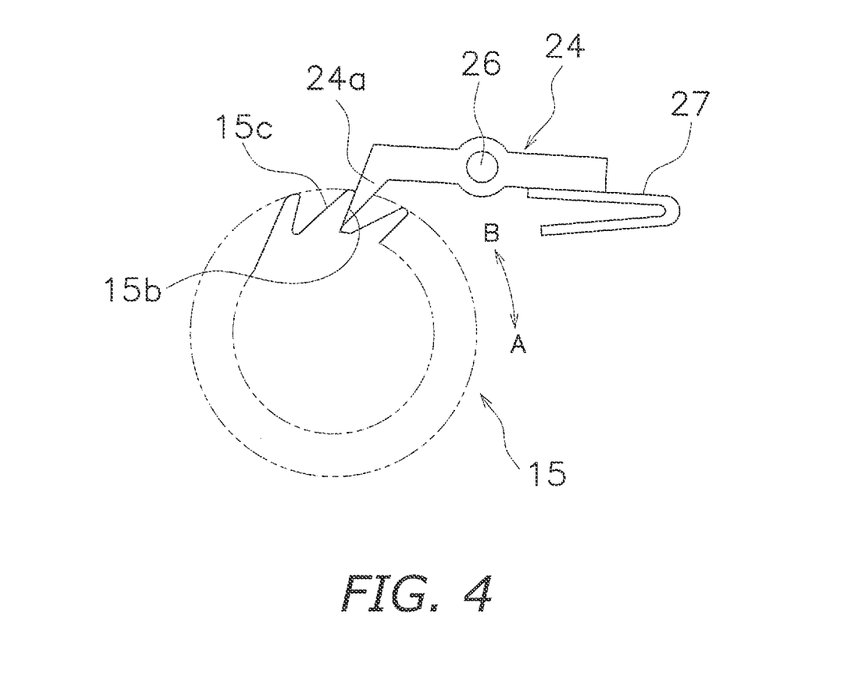
FIG. 4 is a schematic view of an anti-loosening mechanism.

The gear portion 15 has a plurality of teeth. As illustrated in FIG. 3, the teeth have a tapered surface 15a formed by the tip portions thereof in a direction along the handle shaft 8 such that the outer diameter of the teeth is reduced towards the tip ends of the tip portions. In other words, the teeth become narrower as the tapered surface extends towards the tip. Moreover, as illustrated in FIGS. 3 and 4, the teeth of the gear portion 15 are made in the form of ratchet teeth. Each of the teeth of the gear portion 15 has a structure in which one tooth surface 15b is raised from the root circle of the gear portion 15 at a steeper angle than the other tooth surface 15c. It should be noted that FIG. 4 is a view seen from a position away from the handle shaft 8 along the axial direction of the handle shaft 8, and some members such as the nut member 12 are not illustrated therein.

As illustrated in FIG. 2, the male threaded portion 16 and the engaging portion 17 are formed in the same position in the handle axial direction for rotation prevention. In the handle axial direction, an elliptic cross-section is formed by the male threaded portion 16 and the engaging portion 17.

Handle Arm and Handle Knob

As illustrated in FIGS. 1 and 2, the handle arm 10 is a plate member made of metal, and is extending from a first end portion 10a to a second end portion 10b in a direction perpendicular to the handle shaft 8. The handle arm 10 has an elongated hole 10c in the first end portion 10a. The elongated hole 10c is extending in the longitudinal direction of the handle arm 10. The engaging portion 17 of the handle shaft 8 is inserted in the elongated hole 10c. Therefore, the handle arm 10 is non-rotatable relatively to the handle shaft 8, and the position of the handle arm 10 fixed to the handle shaft 8 can be changed within a range that the elongated hole 10c is formed. In other words, the position of the handle arm 10 is adjustable in the elongated hole 10c. The handle knob 11 is rotatably supported by the second end portion 10b of the handle arm 10.

Nut Member

Figure 5:
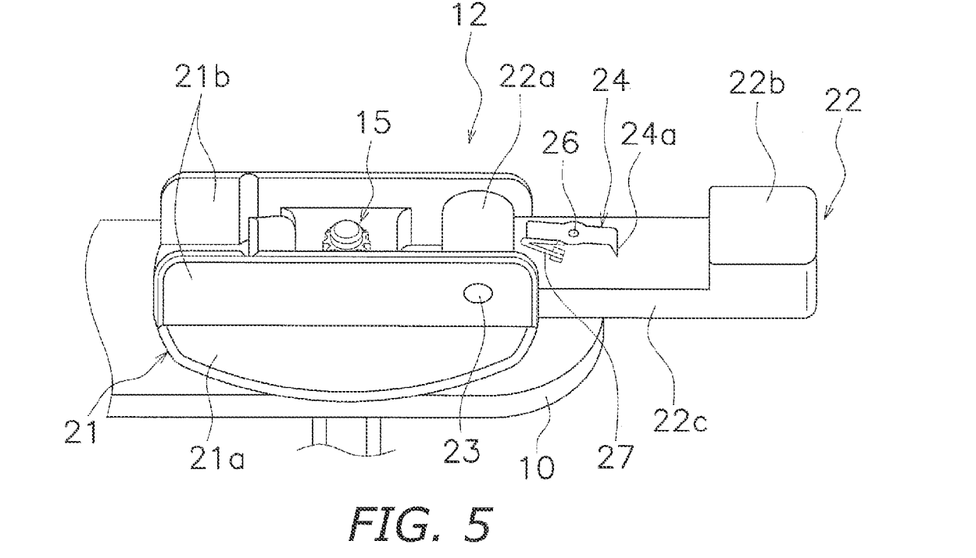
FIG. 5 is an external perspective view of a nut member in an opened state.
Figure 6:
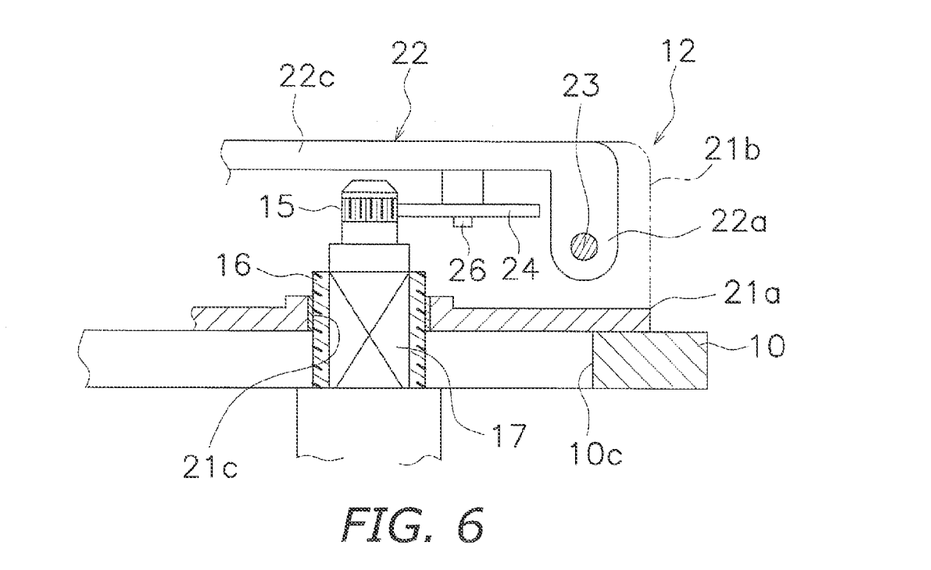
FIG. 6 is a partial cross-sectional view for illustrating a relation between the nut number and the handle shaft.

As illustrated in FIGS. 5 and 6, the nut member 12 includes a body part 21 and a lever part 22 serving as switch operation mechanism. It should be noted that FIG. 5 illustrates an opened position of the nut member 12 that the lever part 22 is opened from the body part 21, whereas FIG. 6 partially illustrates a closed position of the nut member 12 that the lever part 22 is closed to the body part 21. The nut member 12 enables the handle arm 10 to be fixed to the handle shaft 8 by screwing the body part 21 onto the male threaded portion 16 of the handle shaft 8.

The body part 21 has a base portion 21a and a pair of sidewall portions 21b. The base portion 21a is formed in a roughly oval plate shape. The base portion 21a has a female threaded portion 21c in the center part thereof. The female threaded portion 21c is screwed onto the male threaded portion 16 of the handle shaft 8.

The lever part 22 is disposed between the pair of sidewall portions 21b of the body part 21. The lever part 22 has a support portion 22a, a boss portion 22b, and a coupling portion 22c. The support portion 22a is formed in one longitudinal end of the lever part 22, whereas the boss portion 22b is formed in the other longitudinal end of the lever part 22. The coupling portion 22c couples the support portion 22a and the boss portion 22b. The support portion 22a is supported by the pair of sidewall portions 21b through a pin 23 so as to be selectively opened and closed. When the lever part 22 is set in the closed position, the boss portion 22b is configured to make contact with the upper surface of the base portion 21a. The coupling portion 22c is a portion having a thickness smaller than that of the support portion 22a and that of the boss portion 22b. As illustrated in FIGS. 4 to 6, a stopper 24 serving as the anti-loosening member is mounted onto the back surface of the coupling portion 22, i.e., the surface opposed to the tip end of the handle shaft 8.

The stopper 24 extends in an elongated shape along the lever part 22. The longitudinally center part of the stopper 24 is rotatably supported by the back surface of the lever part 22 through a pin 26. The stopper 24 has a pawl 24a formed on the tip end thereof. The pawl 24a is configured to be engaged with the tooth surface 15b (the aforementioned one tooth surface) of the gear portion 15. A flat spring 27 is mounted onto an end portion of the stopper 24 on the opposite side of the tip end that the pawl 24a is formed. The flat spring 27 urges the pawl 24a towards the gear portion 15. The flat spring 27 is supported by the back surface of the lever part 22.

As illustrated in FIG. 4, when the pawl 24a is engaged with the tooth surface 15b (i.e., the aforementioned one tooth surface) of the gear portion 15, the nut member 12 and the gear portion 15 (i.e., the handle shaft 8) are allowed to rotate relatively to each other in an A direction (i.e., a direction of tightening the nut member 12) but are prevented from rotating relatively to each other in a B direction (i.e., a direction of loosening the nut member 12).

Maintaining Mechanism

Figure 7:
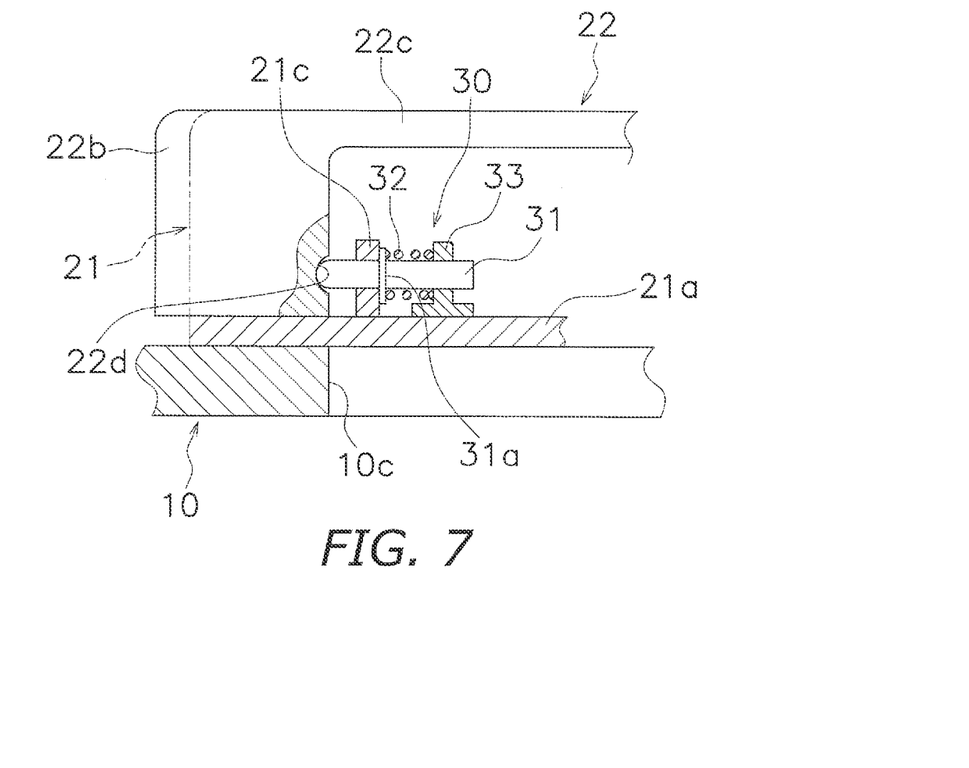
FIG. 7 is a partial side view of a maintaining mechanism.

As illustrated in FIG. 7, the lever part 22 is provided with a maintaining mechanism 30 for maintaining the lever part 22 in the closed position. The maintaining mechanism 30 includes a pin 31, a recess 22d, and a coil spring 32. The pin 31 is slidably supported by a through hole configured in a first support portion 21c and that configured in a second support plate 33. The first support portion 21c is integrally formed with the upper surface of the base portion 21a of the nut member 12. The second support plate 33 is fixed to the upper surface of the base portion 21a. The recess 22d is formed on a lateral surface of the boss portion 21b of the lever part 22, i.e., a surface opposed to the first support portion 21c. When the lever part 22 is set in the closed position, the tip portion of the pin 31 is allowed to be engaged with the recess 22d. The coil spring 32 is disposed between the second support plate 33 and a brimmed portion 31a formed on the pin 31. The coil spring 32 urges the brimmed portion 31a (i.e., the pin 31) towards the recess 22d.

With the structure as described above, the pin 31 can be protruding and retracted along the direction intersecting with the handle shaft 8, while being always urged towards the recess 22d by the coil spring 32. Further, the pin 31 can be moved in a direction away from the boss portion 22b against the urging force of the coil spring 32 by making contact with the lateral surface of the boss portion 22b.

Adjustment of Handle Length

In adjusting the handle length, the lever part 22 of the nut member 12 is opened and is set in the opened position (see FIG. 5). When the lever part 22 is set in the opened position, the pawl 24a of the stopper 24 on the back surface of the lever part 22 and the teeth of the gear portion 15 of the handle shaft 8 are disengaged from each other. Further, under the condition that the lever part 22 is set in the opened position, the tip end (i.e., the boss portion 22b) of the lever part 22 is separated away from the handle shaft 8. Thus, the lever part 22 is herein changed into the form with a long arm length, and this makes it easy to perform a screw tightening operation or a screw loosening operation. Next, the nut member 12 can be separated away from the handle arm 10 by rotating the nut member 12 in the screw loosening direction through the operation of the lever part 22.

Through the aforementioned operation, the handle arm 10 is unfixed from the handle shaft 8, and can be moved in the longitudinal direction thereof. Then, the handle shaft 8 is located in a desired position within the elongated hole 10c of the handle arm 10. Under the condition, the lever part 22 is held and rotated in the direction opposite from that in the aforementioned operation. Accordingly, the nut member 12 can be tightly screwed onto the male threaded portion 16 of the handle shaft 8. Through the tightening of the nut member 12, the handle arm 10 is fixed onto the handle shaft 8. Thereafter, the lever part 22 is set in the closed position.

Prevention of Loosening of Nut Member

When the opened position of the lever part 22 is changed to the closed position, the pawl 24a of the stopper 24 disposed on the back surface of the lever part 22 is engaged with the teeth of the gear portion 15 of the handle shaft 8 (see FIG. 4). Therefore, the nut member 12 can be prevented from rotating in the loosening direction with respect to the handle shaft 8.

It should be noted that, when the pawl 24a of the stopper 24 is engaged with the teeth of the gear portion 15, this engaging action can be smoothly done due to the tapered surface 15a formed on the tip portion of the gear portion 15.

Further, when the nut member 12 is tightly screwed onto the handle shaft 8, this tightening action can be done while the closed position of the lever part 22 is maintained. As illustrated in FIG. 4 and so forth, the teeth of the gear portion 15 are made in the form of ratchet teeth. Therefore, when the nut member 12 is rotated in the A direction depicted in FIG. 4, the pawl 24 runs on the tooth surface 15c (i.e., the aforementioned other tooth surface), and simultaneously, the stopper 24 is rotated in a clockwise direction in the view in FIG. 4 about the pin 26 against the urging force of the flat spring 27. Thus, the nut member 12 can be rotated in the tightening direction.

Maintaining of Position of Lever Part

When the opened position of the lever part 22 is changed to the closed position, the lateral surface of the boss portion 22b makes contact with the tip end of the pin 31 of the maintaining mechanism 30. When the lever part 22 is further pressed into the body part 21 towards the base portion 21a under the condition, the pin 31 is retracted in the direction away from the boss portion 22b against the urging force of the coil spring 32. When the lever part 22 is yet further pressed into the body part 21, the tip end of the pin 31 is fitted into the recess 22d formed on the boss portion 22b. Therefore, the closed position of the lever part 22 is maintained.

Features (1) The nut member 12 is provided with the stopper 24 as the anti-loosening member. Therefore, loosening of the nut member 12 can be reliably prevented even in manually tightening the nut member 12 with a small force.

(2) Rotation of the nut member 12 in the loosening direction can be prevented/allowed by closing/opening the lever part 22 to/from the body part 21. Further, when set in the opened position, the lever part 22 can be used as a lever for operating the nut member 12. Therefore, the nut member 12 can be easily operated.

(3) The pawl 24a of the stopper 24 is always urged by the flat spring 27 so as to be engaged with the teeth of the gear portion 15. Therefore, the pawl 24a can be stably engaged with the teeth of the gear portion 15.

(4) The stopper 24 is disposed on the back surface of the lever part 22. Therefore, the stopper 24 does not extend on the surface of the nut member 12, while the lever part 22 is closed. Accordingly, the fishing line can be prevented from getting stuck with the stopper 24.

(5) When the lever part 22 is closed, the tip end of the pin 31 is fitted into the recess 22d of the lever part 22. Accordingly, the closed position of the lever part 22 is maintained. Therefore, the lever part 22 can be prevented from being unintentionally opened in use.

(6) The tapered surface 15a is formed by the tip portions of the teeth of the gear portion 15. Therefore, when the lever part 22 is closed, the pawl 24a can be easily engaged with the plural teeth.

Other Exemplary Embodiments

The present invention is not limited to the exemplary embodiment as described above, and a variety of changes or modifications can be herein made without departing from the scope of the present invention.

Figure 8:
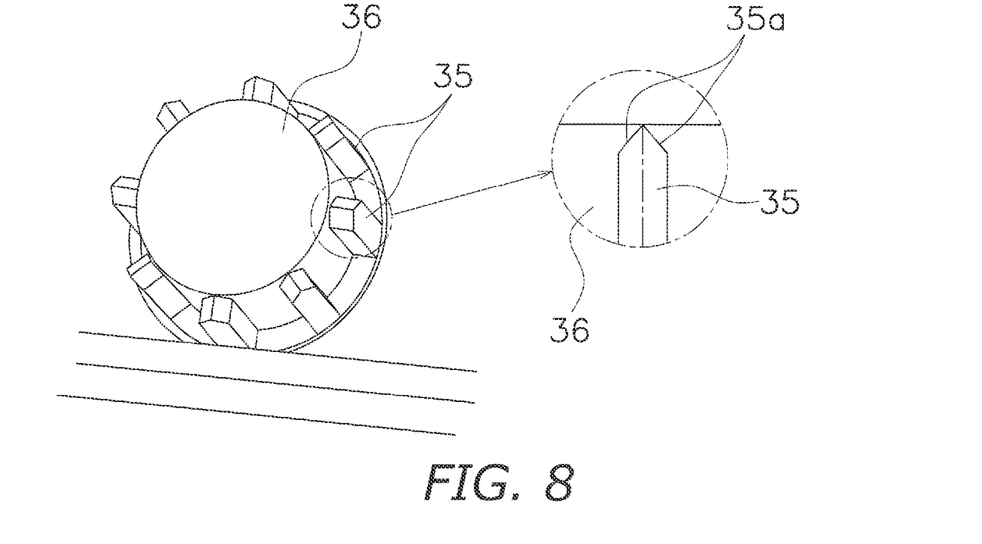
FIG. 8 is an external perspective view of an anti-loosening engaging portion of the handle shaft in another exemplary embodiment.
Figure 9:
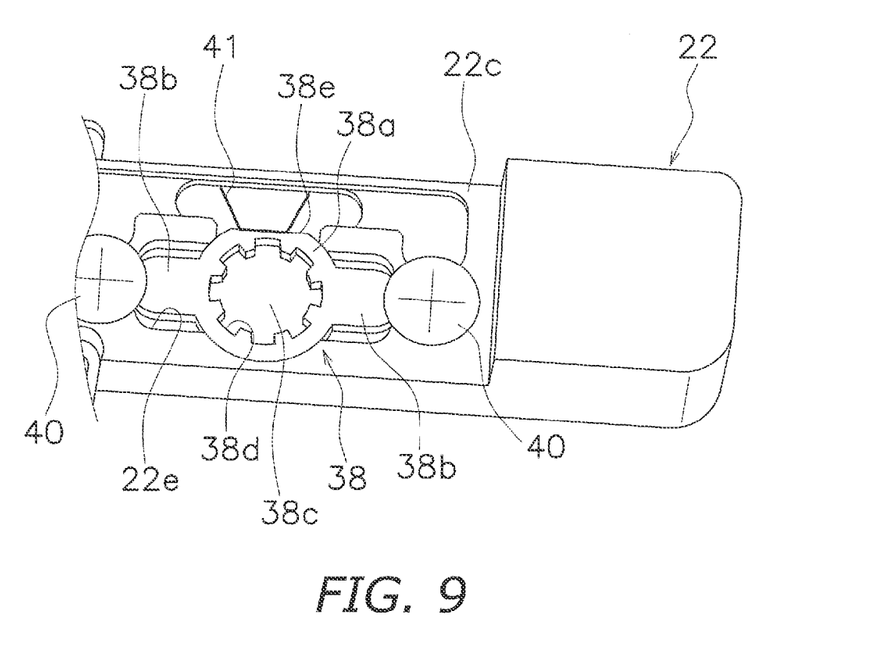
FIG. 9 is a diagram corresponding to FIG. 5 according to another exemplary embodiment.

(a) FIG. 8 illustrates a modification of the anti-loosening engaging portion of the handle shaft 8, whereas FIG. 9 illustrates a modification of the anti-loosening member. In the modification of FIG. 8, the anti-loosening engaging portion of the handle shaft 8 is not made in the form of a gear portion having ratchet teeth but is made in the form of a spline shaft 36 having a plurality of teeth 35. As illustrated in a partially enlarged view in FIG. 8, each tooth 35 of the spline shaft 36 has a pair of tapered surfaces 35a on the tip portion thereof such that the tooth width thereof is reduced towards the tip end of the tip end portion.

Further, as illustrated in FIG. 9, the anti-loosening member is made of a grooved plate 38. The grooved plate 38 extends along the longitudinal direction of the lever part 22, and is disposed in the inside of a groove 22e formed on the back surface of the coupling portion 22c. The grooved plate 38 has a disc portion 38a and a pair of leg portions 38b. The disc portion 38a is formed in the center part of the grooved plate 38. The leg portions 38b extends from the disc portion 38a in opposite directions along the longitudinal direction of the lever part 22. Further, a circular hole 38c is configured in the disc portion 38a. The circular hole 38c has a plurality of grooves 38d formed on the inner peripheral edge thereof. The grooves 38d can be engaged with the respective teeth 35 of the spline shaft 36. Yet further, the tip portion of each leg portion 38b of the pair is rotatably supported, while a slight clearance is reliably produced between a head portion of a screw 40 and the groove 22e.

A clearance is produced between each leg portion 38b of the grooved plate 38 and the groove 22e of the coupling portion 22c. Further, each leg portion 38b of the grooved plate 38 is supported, while a clearance is reliably produced between the head portion of the screw 40 and the groove 22e. With the structure, the grooved plate 38 can be rotated about the circular hole 38c within a predetermined angular range.

Further, a flat portion 38e is formed on a part of the outer periphery of the disc portion 38a of the grooved plate 38. A spring 41, which is formed in a trapezoidal shape in a plan view, makes contact with the flat portion 38e. The grooved plate 38 is maintained in a predetermined rotational position by the urging force of the spring 41.

In the present exemplary embodiment, when the opened position of the lever part 22 is changed to the closed position, the teeth 35 of the spline shaft 36 are engaged with the grooves 38d of the grooved plate 38. Therefore, loosening of the nut member 12 can be prevented while the lever part 22 is closed. Further, when the teeth 35 make contact with a part of the grooved plate 38 in which the grooves 38d are not formed in setting the lever part 22 to the closed position, the grooved plate 38 is rotated against the urging force of the spring 41, and the teeth 35 of the spline shaft 36 are engaged with the grooves 38d of the grooved plate 38.

Even the exemplary embodiment herein described can achieve advantageous effects similar to those achieved by the aforementioned exemplary embodiment.

Figure 10:
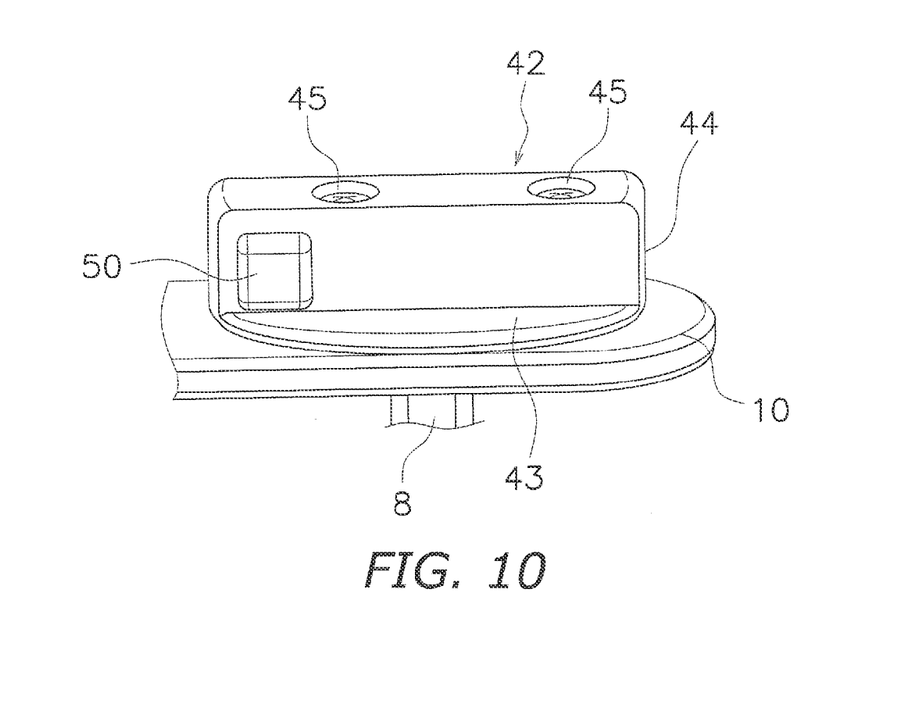
FIG. 10 is an external perspective view of a nut member according to yet another exemplary embodiment.
Figure 11:
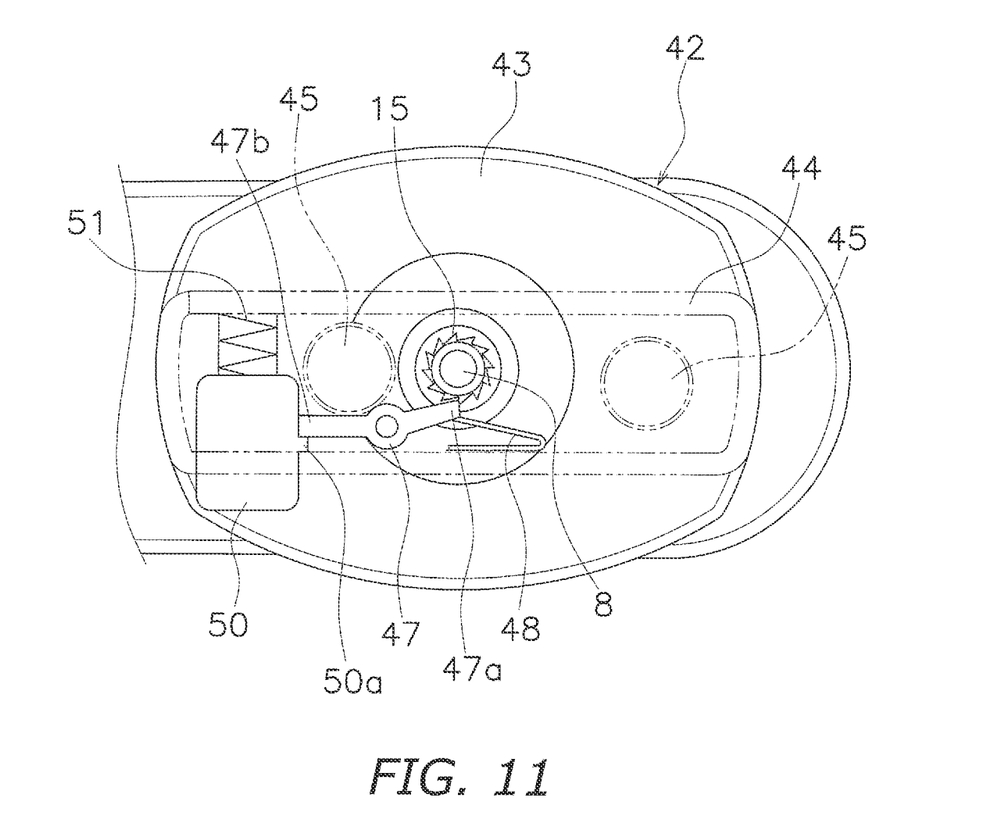
FIG. 11 is a plan view of the nut member illustrated in FIG. 10.

(b) FIGS. 10 and 11 illustrate yet another exemplary embodiment. The structure of the nut member in the present exemplary embodiment is different from the structures of the nut members in the aforementioned respective exemplary embodiment. However, the other structures in the present exemplary embodiment are similar to those in the aforementioned respective exemplary embodiments. It should be noted that FIG. 11 illustrates the interior of the nut member without illustrating a part of the nut member.

A nut member 42 has a base portion 43 and a knob portion 44. Similarly to the aforementioned exemplary embodiment, the base portion 43 is formed in a roughly oval plate shape. The basic structure of the base portion 43 is the same as that of the aforementioned exemplary embodiment. As illustrated in FIG. 6, a hole is configured in the center part of the base portion 43, and further, a female threaded portion is formed in the hole. The knob portion 44 is a box-shaped member opened to the base portion 43 side. The knob portion 44 can be attached to the base portion 43 by two screws 45.

A stopper 47 is rotatably mounted to the inside of the knob portion 44, while being extending in a direction intersecting with the handle shaft 8. The stopper 47 and a plate spring 48 for urging a pawl 47a formed on the tip end of the stopper 47 towards the gear portion 15 are structured similarly to the corresponding ones of the aforementioned exemplary embodiment illustrated in FIG. 4.

A push button 50 (switch operation mechanism) for disengagement is mounted to one end of the knob portion 44. The push button 50 is disposed on a lateral surface of the knob portion 44, while being partially protruding therefrom. The push button 50 can be herein pushed in and out. Further, a coil spring 51 is disposed in the inside of the knob portion 44 in order to urge the push button 50 to the outside. Thus, the push button 50 is always urged by the coil spring 51 so as to be protruding to the outside. When pushed from the outside, the push button 50 is moved to the inside of the knob portion 44.

The push button 50 has a protrusion 50a disposed in the inside of the knob portion 44. The protrusion 50a makes contact with the other end 47b of the stopper 47. Further, when the push button 50 is pushed, the stopper 47 is rotated and the pawl 47a disposed on the tip end of the stopper 47 is disengaged from the teeth of the gear portion 15.

In the exemplary embodiment herein described, when the knob portion 44 is held and rotated in the direction of tightening the nut member 42, the pawl 47a of the stopper 47 gets across the teeth of the gear portion 15 against the urging force of the plate spring 48, and rotation of the nut member 42 is allowed similarly to the aforementioned exemplary embodiment. In contrast, when the nut member 42 tries to rotate in the loosening direction, the pawl 47a of the stopper 47 is engaged with the teeth of the gear portion 15, and rotation of the nut member 42 is prevented. Therefore, loosening of the nut member 42 is prevented.

On the other hand, the push button 50 is firstly pushed in loosening the nut member 42 for the purposes of the length adjustment of the handle arm 10 and so forth. Accordingly, the stopper 47 is rotated and the pawl 47a is disengaged from the teeth of the gear portion 15. Under the condition, the nut member 42 is allowed to be rotated in the loosening direction. Therefore, the handle arm 10 can be unfixed from the handle shaft 8 by loosening the nut member 42, and the length of the handle arm 10 can be changed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean an amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing reel comprising:
   a reel unit;
   a handle shaft being rotatably supported by the reel unit, the handle shaft including an engaging portion, an anti-loosening engaging portion and a male threaded portion on a tip portion thereof;
   a handle arm extending from a first end portion thereof to a second end portion thereof in a direction intersecting wit, h the handle shaft, the handle arm including an elongated hole in the first end portion thereof, the elongated hole extending in the direction, the engaging portion of the handle shaft being inserted in the elongated hole such that the engaging portion engages the handle arm and the handle shaft is non-rotatably engaged with the handle arm, a position of the shaft in the elongated hole being adjustable;
   a handle knob being rotatably attached to the second end portion of the handle arm;
   a nut member including a female threaded portion, the female thread portion being screwed onto the male threaded portion of the handle shaft; and
   an anti-loosening member being configured on the nut member, the anti-loosening member being selectively set in a first position and a second position,
   the anti-loosening member being engaged with the anti-loosening engaging portion in the first position to prevent the nut member from loosening,
   the anti-loosening member being disengaged from the anti-loosening engaging portion in the second position to allow the nut member to rotate in the loosening direction.

2. The fishing reel according to claim 1, further comprising a switch operation mechanism for performing an operation of switching the anti-loosening member between the first position and the second position.

3. The fishing reel according claim 2, wherein the switch operation mechanism includes the lever part.

4. The fishing reel according to claim 1, wherein the anti-loosening member includes
   a stopper being rotatably configured to the nut member, where the stopper is selectively set in the first position and the second position, the stopper is engaged with the anti-loosening engaging portion when the stopper is in the first position, and the stopper is disengaged from the anti-loosening engaging portion when the stopper is in the second position, an urging member configured to urge the stopper towards the first position, and an operating member configured to set the stopper in the second position against an urging force of the urging member.

5. The fishing reel according to claim 4, wherein the switch operation mechanism includes the operating member.

6. A fishing reel comprising:

a reel unit;

a handle shaft being rotatably supported by the reel unit the handle shaft including an anti-loosening engaging portion and a male threaded portion on a tip portion thereof;

a handle arm extending from a first end portion thereof to a second end portion thereof in a direction intersecting with the handle shaft, the handle arm including an elongated hole in the first end portion thereof. the elongated hole extending in the direction, the handle shaft being inserted in the elongated hole to be non-rotatably engaged with the handle arm , a position of the shaft in the elongated hole being adjustable;

a handle knob being rotatably attached to the second end portion of the handle arm;

a nut member including a female threaded portion, the female thread portion being screwed onto the male threaded portion of the handle shaft, a body part in which the female threaded portion is formed, and a lever part being attached to the body part and being movable away from the body part; and an anti-loosening member being configured on the nut member, the anti-loosening member being, selectively set in a first position and a second position, the anti-loosening member being engaged with the anti-loosening engaging portion in the first position to prevent the nut member from loosening, the anti-loosening member being disengaged from the anti-loosening engaging portion in the second position to allow the nut member to rotate in the loosening direction, and the anti-loosening member being configured to the lever part and includes a pawl, the pawl being configured to be engaged with the anti-loosening engaging portion when the lever part is attached to the body part, and the pawl being configured to be disengaged from the anti-loosening engaging portion when the lever part is moved away from the body part.

7. The fishing reel according to claim 6, further comprising a pawl urging member being configured to urge the pawl towards the anti-loosening engaging portion.

8. The fishing reel according to claim 6, wherein the anti-loosening member is configured on a surface of the lever part in opposition to the handle shaft.

9. The fishing reel according to claim 6, wherein the lever part is elongated in one direction, one longitudinal end of the lever part is coupled to the body part, and the lever part extends in a direction intersecting with the handle shaft when lever part is moved away from the body part.

10. The fishing reel according to claim 6, further comprising a maintaining mechanism configured to maintain the lever part when the lever is attached to the body part.

11. The fishing reel according to claim 10, wherein the maintaining mechanism includes a pin being configured to the body part, where the pin is configured to be advanced and retracted along the direction intersecting with the handle shaft, a recess being formed on the lever part, where a tip portion of the pin is engaged with the recess when the lever part is attached to the body part, and a pin urging member being configured to urge the pin towards the recess.

12. The fishing reel according to claim 6, wherein the anti-loosening engaging portion includes a plurality of teeth formed on the tip portion of the handle shaft.

13. The fishing reel according to claim 12, wherein each of the plurality of teeth include a tapered surface having a tip portion, and a diameter of the tapered surface becomes narrower as the tapered surface extends further towards the tip portion.

14. The fishing reel according to claim 12, wherein the anti-loosening member includes a stopper plate being configured on the surface of the lever part in opposition to the handle shaft, and the stopper plate includes a plurality of recesses to be meshed with the plurality of teeth.

15. The fishing reel according to claim 14, further comprising a plate urging member configured to urge the stopper plate to a predetermined angular position, wherein the stopper plate is supported by the lever part to be rotatable within a predetermined angular range.

16. The fishing reel according to claim 14, wherein each of the plurality of teeth includes a tapered surface having a tip portion, and a width of each of the plurality of teeth becomes smaller as the tapered surface extends further to the tip portions.

* * * * *